US009244845B2

United States Patent
Rowlands et al.

(10) Patent No.: US 9,244,845 B2
(45) Date of Patent: Jan. 26, 2016

(54) SYSTEM AND METHOD FOR IMPROVING SNOOP PERFORMANCE

(71) Applicant: NetSpeed Systems, San Jose, CA (US)

(72) Inventors: Joe Rowlands, San Jose, CA (US); Sailesh Kumar, San Jose, CA (US)

(73) Assignee: NetSpeed Systems, San Jose, CA (US)

( * ) Notice: Subject to any disclaimer, the term of this patent is extended or adjusted under 35 U.S.C. 154(b) by 113 days.

(21) Appl. No.: 14/275,608

(22) Filed: May 12, 2014

(65) Prior Publication Data

US 2015/0324288 A1 Nov. 12, 2015

(51) Int. Cl.
*G06F 12/00* (2006.01)
*G06F 12/08* (2006.01)

(52) U.S. Cl.
CPC .......... *G06F 12/084* (2013.01); *G06F 12/0817* (2013.01); *G06F 12/0831* (2013.01); *G06F 12/0833* (2013.01); *G06F 12/0842* (2013.01); *G06F 2212/314* (2013.01); *G06F 2212/62* (2013.01); *G06F 2212/622* (2013.01)

(58) Field of Classification Search
CPC  G06F 12/0817; G06F 12/084; G06F 12/0842
See application file for complete search history.

(56) References Cited

U.S. PATENT DOCUMENTS

| 5,432,785 | A  | 7/1995  | Ahmed et al. |
| 5,764,740 | A  | 6/1998  | Holender |
| 5,991,308 | A  | 11/1999 | Fuhrmann et al. |
| 6,003,029 | A  | 12/1999 | Agrawal et al. |
| 6,249,902 | B1 | 6/2001  | Igusa et al. |
| 6,415,282 | B1 | 7/2002  | Mukherjea et al. |
| 6,704,842 | B1*| 3/2004  | Janakiraman ....... G06F 12/0817 711/141 |
| 6,925,627 | B1 | 8/2005  | Longway et al. |
| 7,065,730 | B2 | 6/2006  | Alpert et al. |
| 7,318,214 | B1 | 1/2008  | Prasad et al. |
| 7,590,959 | B2 | 9/2009  | Tanaka |
| 7,725,859 | B1 | 5/2010  | Lenahan et al. |
| 7,808,968 | B1 | 10/2010 | Kalmanek, Jr. et al. |
| 7,917,885 | B2 | 3/2011  | Becker |
| 8,050,256 | B1 | 11/2011 | Bao et al. |
| 8,059,551 | B2 | 11/2011 | Milliken |

(Continued)

FOREIGN PATENT DOCUMENTS

| CN | 103684961 A | 3/2014 |
| WO | 2014059024 A1 | 4/2014 |

OTHER PUBLICATIONS

Abts, D., et al., Age-Based Packet Arbitration in Large-Radix k-ary n-cubes, Supercomputing 2007 (SC07), Nov. 10-16, 2007, 11 pgs.

(Continued)

*Primary Examiner* — Shawn X Gu
(74) *Attorney, Agent, or Firm* — Procopio, Cory, Hargreaves & Savitch LLP

(57) ABSTRACT

The present disclosure is directed to hardware hash tables, and more specifically, to generation of a cache coherent system such as in a Network on Chip (NoC). The present disclosure is further directed to a directory structure that includes a new field, referred to, for instance as, encoded value, which indicates the original owner of a dirty line. As an original holder may have held or modified the original line, by tracking the original holder, example implementations can track the agents that are potentially dirty, as the encoded value can indicate the agent with the most recently unique line, which can then be shared with the other agents.

12 Claims, 12 Drawing Sheets

(56) References Cited

U.S. PATENT DOCUMENTS

| | | |
|---|---|---|
| 8,099,757 B2 | 1/2012 | Riedle et al. |
| 8,136,071 B2 | 3/2012 | Solomon |
| 8,281,297 B2 | 10/2012 | Dasu et al. |
| 8,312,402 B1 | 11/2012 | Okhmatovski et al. |
| 8,448,102 B2 | 5/2013 | Kornachuk et al. |
| 8,492,886 B2 | 7/2013 | Or-Bach et al. |
| 8,541,819 B1 | 9/2013 | Or-Bach et al. |
| 8,543,964 B2 | 9/2013 | Ge et al. |
| 8,601,423 B1 | 12/2013 | Philip et al. |
| 8,635,577 B2 | 1/2014 | Kazda et al. |
| 8,667,439 B1 | 3/2014 | Kumar et al. |
| 8,717,875 B2 | 5/2014 | Bejerano et al. |
| 2002/0071392 A1 | 6/2002 | Grover et al. |
| 2002/0073380 A1 | 6/2002 | Cooke et al. |
| 2002/0095430 A1 | 7/2002 | Egilsson et al. |
| 2004/0216072 A1 | 10/2004 | Alpert et al. |
| 2005/0147081 A1 | 7/2005 | Acharya et al. |
| 2006/0161875 A1 | 7/2006 | Rhee |
| 2007/0118320 A1 | 5/2007 | Luo et al. |
| 2007/0244676 A1 | 10/2007 | Shang et al. |
| 2007/0256044 A1 | 11/2007 | Coryer et al. |
| 2007/0267680 A1 | 11/2007 | Uchino et al. |
| 2008/0072182 A1 | 3/2008 | He et al. |
| 2008/0120129 A1 | 5/2008 | Seubert et al. |
| 2009/0070726 A1 | 3/2009 | Mehrotra et al. |
| 2009/0268677 A1 | 10/2009 | Chou et al. |
| 2009/0313592 A1 | 12/2009 | Murali et al. |
| 2010/0040162 A1 | 2/2010 | Suehiro |
| 2011/0035523 A1 | 2/2011 | Feero et al. |
| 2011/0060831 A1 | 3/2011 | Ishii et al. |
| 2011/0072407 A1 | 3/2011 | Keinert et al. |
| 2011/0154282 A1 | 6/2011 | Chang et al. |
| 2011/0276937 A1 | 11/2011 | Waller |
| 2012/0022841 A1 | 1/2012 | Appleyard |
| 2012/0023473 A1 | 1/2012 | Brown et al. |
| 2012/0026917 A1 | 2/2012 | Guo et al. |
| 2012/0110541 A1 | 5/2012 | Ge et al. |
| 2012/0155250 A1 | 6/2012 | Carney et al. |
| 2013/0051397 A1 | 2/2013 | Guo et al. |
| 2013/0080073 A1 | 3/2013 | de Corral |
| 2013/0103369 A1 | 4/2013 | Huynh et al. |
| 2013/0151215 A1 | 6/2013 | Mustapha |
| 2013/0159944 A1 | 6/2013 | Uno et al. |
| 2013/0174113 A1 | 7/2013 | Lecler et al. |
| 2013/0207801 A1 | 8/2013 | Barnes |
| 2013/0219148 A1 | 8/2013 | Chen et al. |
| 2013/0263068 A1 | 10/2013 | Cho et al. |
| 2013/0326458 A1 | 12/2013 | Kazda et al. |
| 2014/0068132 A1 | 3/2014 | Philip et al. |
| 2014/0092740 A1 | 4/2014 | Wang et al. |
| 2014/0098683 A1 | 4/2014 | Kumar et al. |
| 2014/0115218 A1 | 4/2014 | Philip et al. |
| 2014/0115298 A1 | 4/2014 | Philip et al. |

OTHER PUBLICATIONS

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, F, et al., Fairness via Source Throttling: A Configurable and High-Performance Fairness Substrate for Multi-Core Memory Systems, ASPLOS '10, Mar. 13-17, 2010, 12 pgs.

Grot, B., Preemptive Virtual Clock: A Flexible, Efficient, and Cost-Effective Qos Scheme for Networks-on-Chip, Micro '09, Dec. 12-16, 2009, 12 pgs.

Grot, B., Kilo-NOC: A Heterogeneous Network-on-Chip Architecture for Scalability and Service Guarantees, ISCA '11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Jiang, N., et al., Performance Implications of Age-Based Allocations in On-Chip Networks, CVA Memo 129, May 24, 2011, 21 pgs.

Lee, J. W, et al., Globally-Synchronized Frames for Guaranteed Quality-of-Service in On-Chip Networks, 35th IEEE/ACM International Symposium on Computer Architecture (ISCA), Jun. 2008, 12 pgs.

Lee, M. M., et al., Approximating Age-Based Arbitration in On-Chip Networks, PACT '10, Sep. 11-15, 2010, 2 pgs.

Li, B., et al., CoQoS: Coordinating QoS-Aware Shared Resources in NoC-based SoCs, J. Parallel Distrib. Comput., 71 (5), May 2011, 14 pgs.

International Search Report and Written Opinion for PCT/US2013/064140, Jan. 22, 2014, 9 pgs.

International Search Report and Written Opinion for PCT/US2014/012003, Mar. 26, 2014, 9 pgs.

International Search Report and Written Opinion for PCT/US2014/012012, May 14, 2014, 9 pgs.

Ababei, C., et al., Achieving Network on Chip Fault Tolerance by Adaptive Remapping, Parallel & Distributed Processing, 2009, IEEE International Symposium, 4 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Gindin, R., et al., NoC-Based FPGA: Architecture and Routing, Proceedings of the First International Symposium on Networks-on-Chip (NOCS'07), May 2007, pp. 253-262.

Yang, J., et al., Homogeneous NoC-based FPGA: The Foundation for Virtual FPGA, 10th IEEE International Conference on Computer and Information Technology (CIT 2010), Jun. 2010, pp. 62-67.

* cited by examiner

| STATE 502 | ADDRESS TAG 506 | BIT VECTOR 508 | ENCODED VALUE 510 |
|---|---|---|---|
| READ ONLY | 000 | 0100101010101 | AGENT A |
| READ/WRITE | 001 | 0010101010101 | AGENT B |
| UNCACHED | 010 | 0001010101010 | AGENT C |
| READ/WRITE | 011 | 1101010101010 | AGENT D |
| READ/WRITE | 100 | 1001010101010 | AGENT E |
| READ | 101 | 1110101010101 | AGENT F |
| . | . | . | . |
| . | . | . | . |

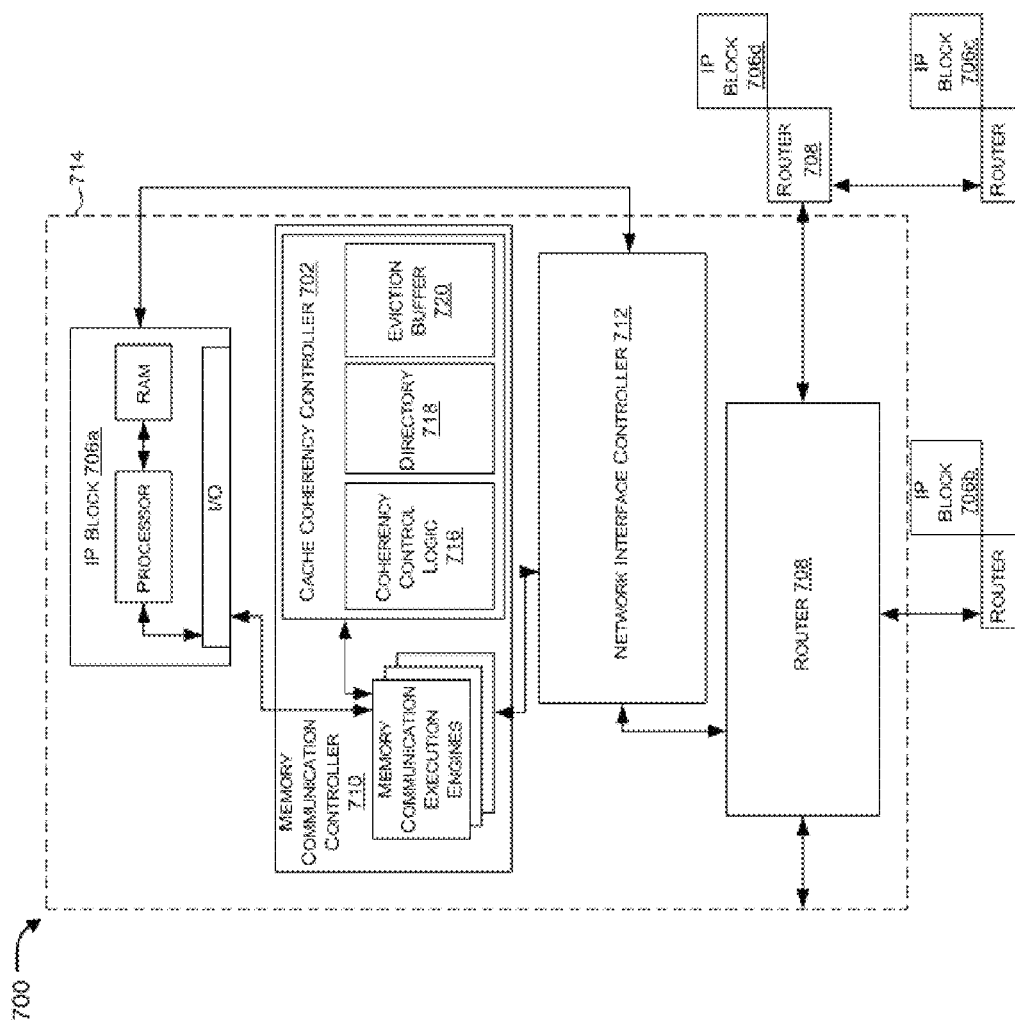

SYSTEM AND METHOD FOR IMPROVING SNOOP PERFORMANCE

BACKGROUND

1. Technical Field

Methods and example implementations described herein are generally directed to hardware hash tables, and more specifically, to generation of a cache coherent Network on Chip (NoC).

2. Related Art

The number of components on a chip is rapidly growing due to increasing levels of integration, system complexity and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components, which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1(a)), 2-D (two dimensional) mesh (as shown in FIG. 1(b)) and 2-D Torus (as shown in FIG. 1(c)) are examples of topologies in the related art. Mesh and Torus can also be extended to 2.5-D (two and half dimensional) or 3-D (three dimensional) organizations. FIG. 1(d) shows a 3D mesh NoC, where there are three layers of 3×3 2D mesh NoC shown over each other. The NoC routers have up to two additional ports, one connecting to a router in the higher layer, and another connecting to a router in the lower layer. Router 111 in the middle layer of the example has both ports used, one connecting to the router at the top layer and another connecting to the router at the bottom layer. Routers 110 and 112 are at the bottom and top mesh layers respectively, therefore they have only the upper facing port 113 and the lower facing port 114 respectively connected.

Packets are message transport units for intercommunication between various components. Routing involves identifying a path composed of a set of routers and physical links of the network over which packets are sent from a source to a destination. Components are connected to one or multiple ports of one or multiple routers; with each such port having a unique ID. Packets carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may implemented in hardware, maintains packet ordering and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2(a) pictorially illustrates an example of XY routing in a two dimensional mesh. More specifically, FIG. 2(a) illustrates XY routing from node '34' to node '00'. In the example of FIG. 2(a), each component is connected to only one port of one router. A packet is first routed over the x-axis till the packet reaches node '04' where the x-coordinate of the node is the same as the x-coordinate of the destination node. The packet is next routed over the y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects may employ wormhole routing, wherein, a large message or packet is broken into small pieces known as flits (also referred to as flow control digits). The first flit is the header flit, which holds information about this packet's route and key message level info along with payload data and sets up the routing behavior for all subsequent flits associated with the message. Optionally, one or more body flits follows the head flit, containing the remaining payload of data. The final flit is the tail flit, which in addition to containing the last payload also performs some bookkeeping to close the connection for the message. In wormhole flow control, virtual channels are often implemented.

The physical channels are time sliced into a number of independent logical channels called virtual channels (VCs). VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Torus NoC, there may exist multiple route paths of equal length or number of hops between any pair of source and destination nodes. For example, in FIG. 2(b), in addition to the standard XY route between nodes 34 and 00, there are additional routes available, such as YX route 203 or a multi-turn route 202 that makes more than one turn from source to destination.

In a NoC with statically allocated routes for various traffic slows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, then no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer; the message is then routed to the destination on the NoC layer, where it is delivered from the NoC layer to the host. Thus, each layer operates more or less independently from each other, and interactions between layers may only occur during the injection and ejection times. FIG. 3(a) illustrates a two layer NoC. Here the two NoC layers are shown adjacent to each other on the left and right, with the hosts connected to the NoC replicated in both left and right diagrams. A host is connected to two routers in this example—a router in the first layer shown as R1, and a router is the second layer shown as R2. In this example, the multi-layer NoC is different from the 3D NoC, i.e. multiple layers are on a single silicon die and are used to meet the high bandwidth demands of the communication between hosts on the same silicon die. Messages do not go from one layer to another. For purposes of clarity, the present application will utilize such a horizontal left and right illustration for multi-layer NoC to differentiate from the 3D NoCs, which are illustrated by drawing the NoCs vertically over each other.

In FIG. 3(b), a host connected to a router from each layer, R1 and R2 respectively, is illustrated. Each router is connected to other routers in its layer using directional ports 301, and is connected to the host using injection and ejection ports 302. A bridge-logic 303 may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements.

In a NoC interconnect, if the traffic profile is not uniform and there is certain amount of heterogeneity (e.g., certain hosts talk to each other more frequently than the others), the interconnect performance may depend a lot on the NoC topology and where various hosts are placed in the topology with respect to each other and to what routers they are connected to. For example, if two hosts talk to each other frequently and need higher bandwidth, they should be placed next to each other. This will reduce the latency for this communication, and thereby reduce the global average latency, as well as reduce the number of router nodes and links over which the high bandwidth of this communication must be provisioned. Moving two hosts close by may make certain other hosts far apart since all hosts must fit into the 2D planar NoC topology without overlapping with each other. Thus, right tradeoffs must be made and the hosts must be placed after examining the pair-wise bandwidth and latency requirements between all hosts so that certain global cost and performance metrics is optimized. The cost and performance metrics can include the average structural latency between all communicating hosts in number of router hops, or the sum of the bandwidth between all pair of hosts and the distance between them in number of hops, or some combination thereof. This optimization problem is known to be non-deterministic polynomial-time hard (NP-hard) and heuristic based approaches are often used. The hosts in a system may vary is shape and sizes with respect to each other which puts additional complexity in placing them in a 2D planar NoC topology, packing them optimally leaving little whitespaces, and avoiding overlapping hosts.

In a NoC architecture, there is a need to maintain cache coherency among the agents in the NoC as explained, for example, in U.S. patent application Ser. No. 13/965,668, herein incorporated by reference in its entirety for all purposes. Related art methods for maintaining cache coherency involve several methods for maintaining cache coherent data. In one example related art method, a single, universal copy of data is maintained, and the agents refer only to the universal copy. In another example related art method, the agents may include their own cache and thereby maintain their own copies of data. In a heterogeneous system wherein agents may or may not have their own cache, both of the related art methods can be employed and managed by using various cache coherency protocols such as MESI (Modified Exclusive Shared Invalid), MSI, MOESI (Modified Owned Exclusive Shared Invalid) and so on.

To manage the transition between states for the cache coherency protocols, related art methods perform a lookup of the coherent state on cache request. Based on the lookup of the coherent state, transition commands may be issued to existing caches to change their state. The lookup of the coherent state requires either a broadcasting to all of the agents associated with the NoC or a directory structure that tracks the current states and can be used for managing the states of the caches.

Snooping is a process where the individual caches monitor address lines for accesses to memory locations that they have cached instead of a centralized directory-like structure handling the monitoring. When a write operation is observed to a location that a cache has a copy of, the cache controller invalidates its own copy of the snooped memory location. In the snooping solution, a snoopy bus is incorporated to send all requests for data to all processors, wherein the processors snoop to see if they have a copy and respond accordingly. This mechanism therefore involves a broadcast, since caching information is stored in the processors. A multiple snoop filter reduces the snooping traffic by maintaining a plurality of entries, each representing a cache line that may be owned by one or more nodes. When replacement of one of the entries is required, the snoop filter selects for replacement the entry representing the cache line or lines owned by the fewest nodes, as determined from a presence vector in each of the entries. A temporal or other type of algorithm is used to refine the selection if more than one cache line is owned by the fewest number of nodes.

In related art implementations, there is a snooping architecture based on a directory structure. For every coherent lookup, a snoop is broadcast to the agents. If the agent has the data corresponding to the snoop, then the data is provided. If any agent has a dirty copy of the line, that agent is compelled to provide data in response to the snoop. However, in such configurations, the multiple coherent agents may experience high latency due to access to the memory controller through the coherency controller. Thus, if the copy can be obtained directly from the agent rather than retrieval through the memory controller, then latency can be reduced. In related art implementations, non-dirty agents can provide data directly to reduce the latency. However, because the agents are not coordinated, each agent will provide the copy autonomously.

In related art implementations for directory-based protocol, an address is tracked as well as the agents having a copy of the address. FIG. 4 illustrates an example directory. The directory may include entries for state (e.g. read only, read/write, etc.), address tag to indicate address within the cache containing the data, and a bit vector indicating agents that have caches containing or sharing the data. The bit vector is configured based on the specification. For example, if the NoC is associated with 64 agents, the bit vector may have a 64 bit long vector with each bit indicating if the data is held in the corresponding agent or not. In one aspect, the cache coherency controller can be configured to retrieve, from a directory, the state of the cache line and return the state of the cache line to a requesting memory communications controller.

However, the directory does not provide any indication as to which agent has a dirty copy of the line. In related art implementations, there is no preference system for selecting an agent that will provide data. Only a dirty agent is compelled to provide data, while the other agents may discard their own copy at any time. Such related art implementations attempt to resolve the bandwidth issue in several ways. One related art implementation involves having a guaranteed provider of data that is known. A protocol is constructed such that if the agent has the copy of the line, the agent is configured to permanently hold the copy until copy is acknowledged. Certain agents in the system will not have such a guarantee. Any agent in the exclusive or modified state would be required to provide data (E/M/O in MOESI, E/M in MESI).

In another related art implementation, a snoop operation is sent to the dirty agent. In a protocol such as MOESI, agents designated as M/O may contain dirty data, however this is not verifiable because the agent is silent. For example, an agent with 'O' status may downgrade its dirty copy. Although the data is assumed to be dirty, the dirtiness status is not communicated via the snoop.

In another related art implementation, all of the agents may be snooped to determine the agent with the dirty copy, however, such an implementation is bandwidth intensive.

SUMMARY

The present disclosure is directed to hardware hash tables, and more specifically, to generation of a cache coherent system such as in a Network on Chip (NoC). The present disclosure is further directed to a directory structure that includes a new field, referred to, for instance as, encoded value, which indicates the original holder of a line. As an original holder may have held or modified the original line, by tracking the original holder, example implementations can track the agents that are potentially dirty, as the encoded value can indicate the agent that most recently held a unique copy of the line, which can then be shared with the other agents.

Aspects of the present application may include a method, which involves configuring a coherency directory to have, for each data line, a share state, a bit vector indicative of shared agents, and an encoded value as an indicator of a potentially dirty agent. Directory construction can further include an address tag. Any desired representation can be incorporated for indicating a dirty agent, which can include the agent number, agent identifier, or any other like representation. The method can further include receiving a first data line request from a requester agent, and taking into account the first data line request for parsing the coherency directory to identify the entry corresponding to the first data line and identifying content of the identified entry. The method can further include retrieving the encoded value of the potentially dirty agent from the parsed entry, wherein if the encoded value of the retrieved potentially dirty agent is NULL, requested first line data can be retrieved from another source of data, whereas, in case the encoded value of the retrieved potentially dirty agent is not NULL, a snoop operation can be executed for the identified potentially dirty agent and dirty data can be extracted from the identified potentially dirty agent. The method can further include removing the encoded value of the potentially dirty agent and incorporating the potentially dirty agent into the bit vector. The method can further include setting a new encoded value such that the new encoded value is indicative of the requesting agent.

Aspects of the present disclosure may include a computer readable storage medium storing instructions for executing a process. The instructions may involve managing a coherency directory comprising a plurality of entries, wherein each entry includes a data line and a share state indicative of a list of shared agents in a cache coherent system of the data line, and wherein the share state or any other attribute of the directory entry is also indicative of a potentially dirty one of the shared agents. The instructions may further involve executing a request for a data line by parsing one of the plurality of entries corresponding to the data line, and, during parsing, in case one of the plurality of entries is found to have a potentially dirty agent, a snoop operation can be executed only to the potentially dirty agent indicated by the share state. On the other hand, in case no potentially dirty agent is found, i.e. encoded value in the directory entry is NULL, retrieval of the requested data line from any one of other sources of data can be performed. The instructions may further include, during or after the snoop operation, removing the encoded value, and incorporating the potentially dirty agent into the share vector such that dirty data, in response to the data line request, can be provided to the requester agent and a new encoded value can be set in order to be indicative of the requester agent.

Aspects of the present disclosure may include a system/controller configured to implement the cache coherent system of the present disclosure, wherein the controller can be configured to manage a coherency directory comprising a plurality of entries, wherein each entry comprises a data line, and a share state indicative of a list of shared agents in the cache coherent system of the data line, wherein the share state can, directly or indirectly, be indicative of a potentially dirty one of the shared agents. Controller can further be configured to execute a request for a data line by parsing one of the plurality of entries corresponding to the data line. In case, during the parsing, a potentially dirty one of the shared agents is found, a snoop operation can be executed only to the potentially dirty one of the shared agents indicated by the share state, whereas, in case no potentially dirty agent is found, i.e. a null encoded value is identified, retrieval of the requested data line from any one of other sources of data can be performed. Controller can further be configured to, for a dirty data response to the snoop operation for the one of the plurality of entries, remove the encoded value and incorporate the potentially dirty agent of the cache coherent system corresponding to the encoded value to the share vector. In yet another implementation, for the dirty data response to the snoop operation for the one of the plurality of entries, the dirty data in response to the request can be provided to the requester agent and a new encoded value can be assigned to the requesting agent.

BRIEF DESCRIPTION OF THE DRAWINGS

FIG. 5 illustrates an example of a directory for a cache coherent system, in accordance with an example implementation.

FIG. 7 illustrates an exemplary architecture block diagram of a NoC showing a cache coherency controller in accordance with an embodiment of the present disclosure.

DETAILED DESCRIPTION

Figure 1A:
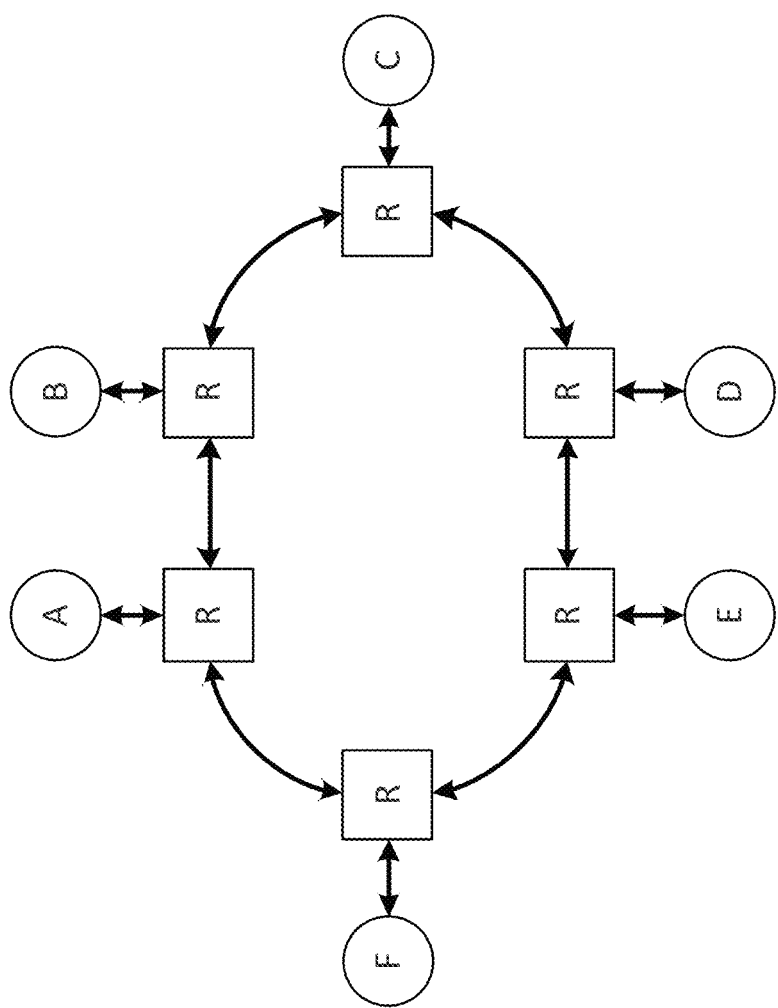
FIGS. 1(a), 1(b) 1(c) and 1(d) illustrate examples of Bidirectional ring, 2D Mesh, 2D Taurus, and 3D Mesh NoC Topologies.
Figure 1B:
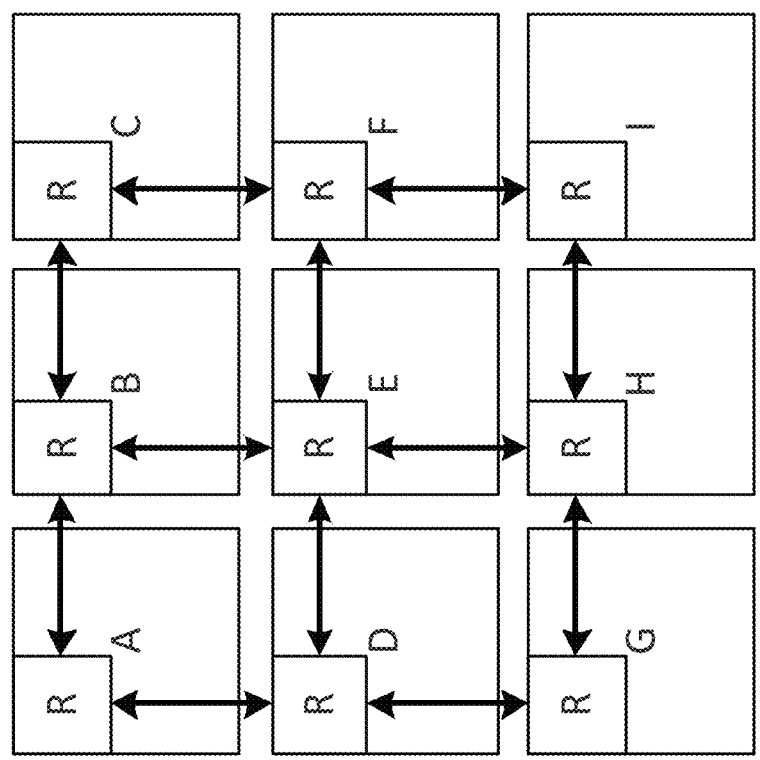
Figure 1C:
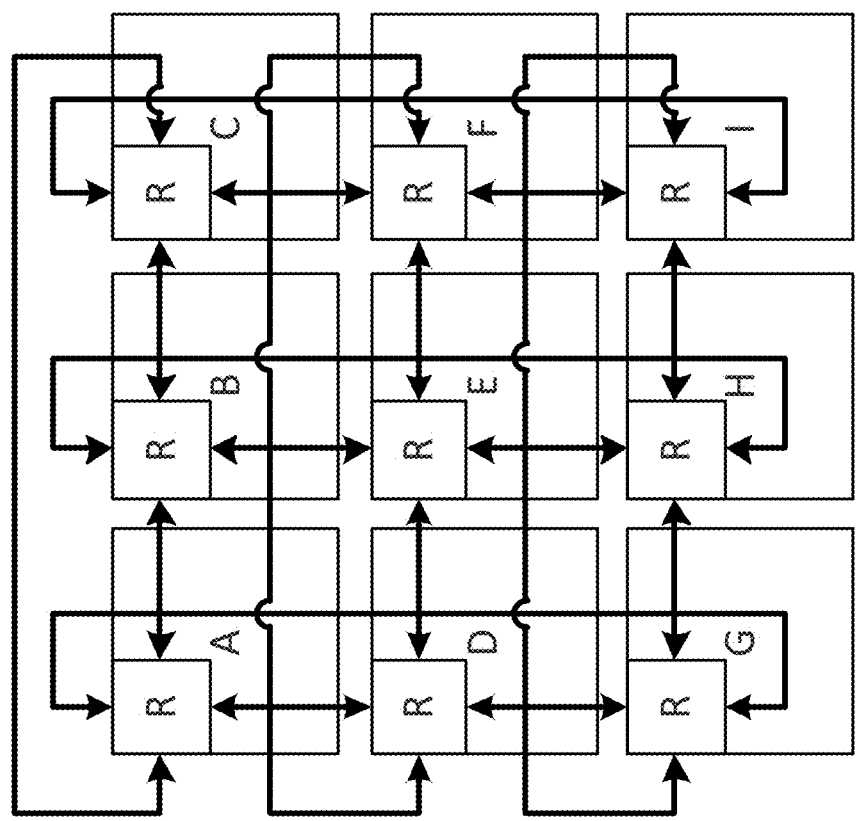
Figure 1D:
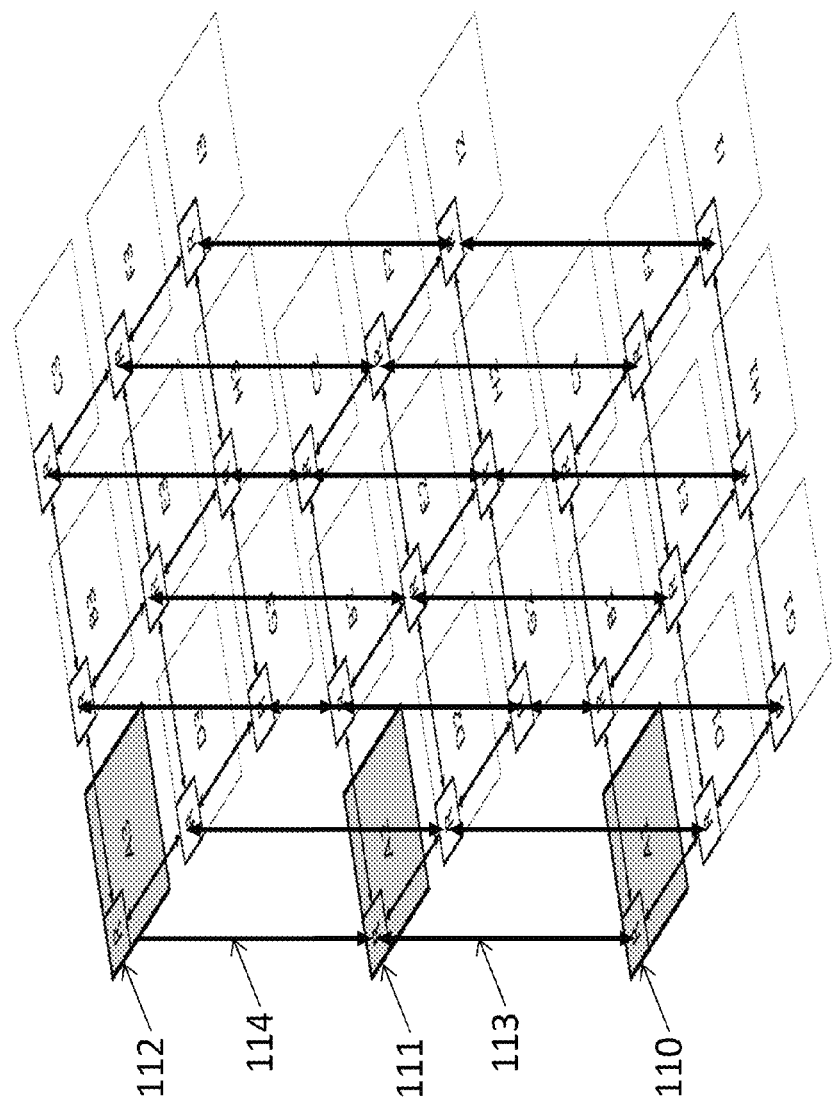
Figure 2A:
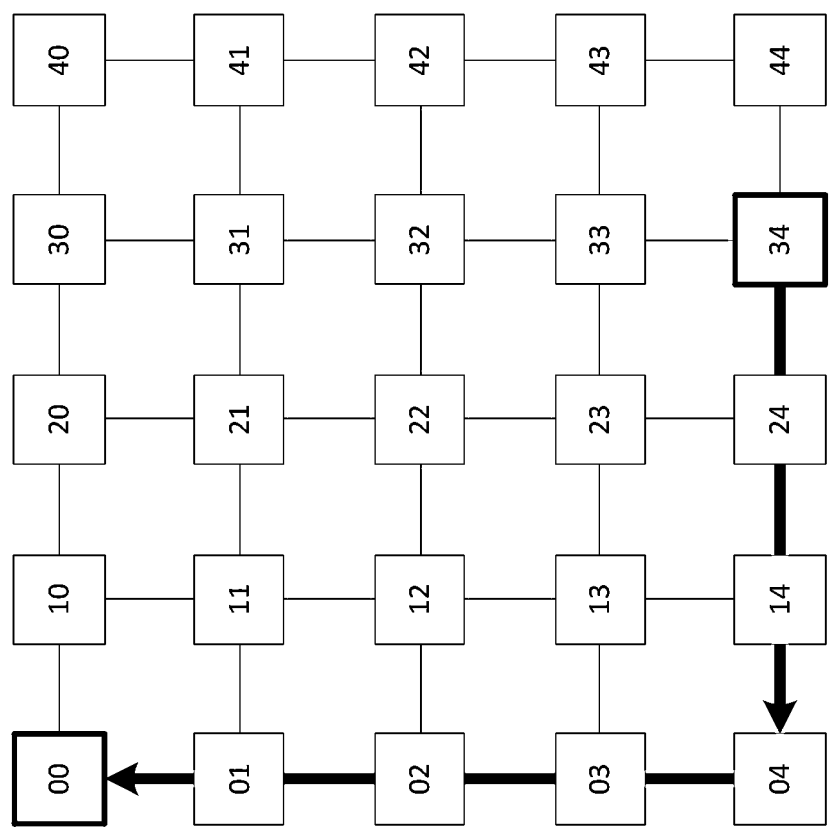
FIG. 2(a) illustrates an example of XY routing in a related art two dimensional mesh.
Figure 2B:
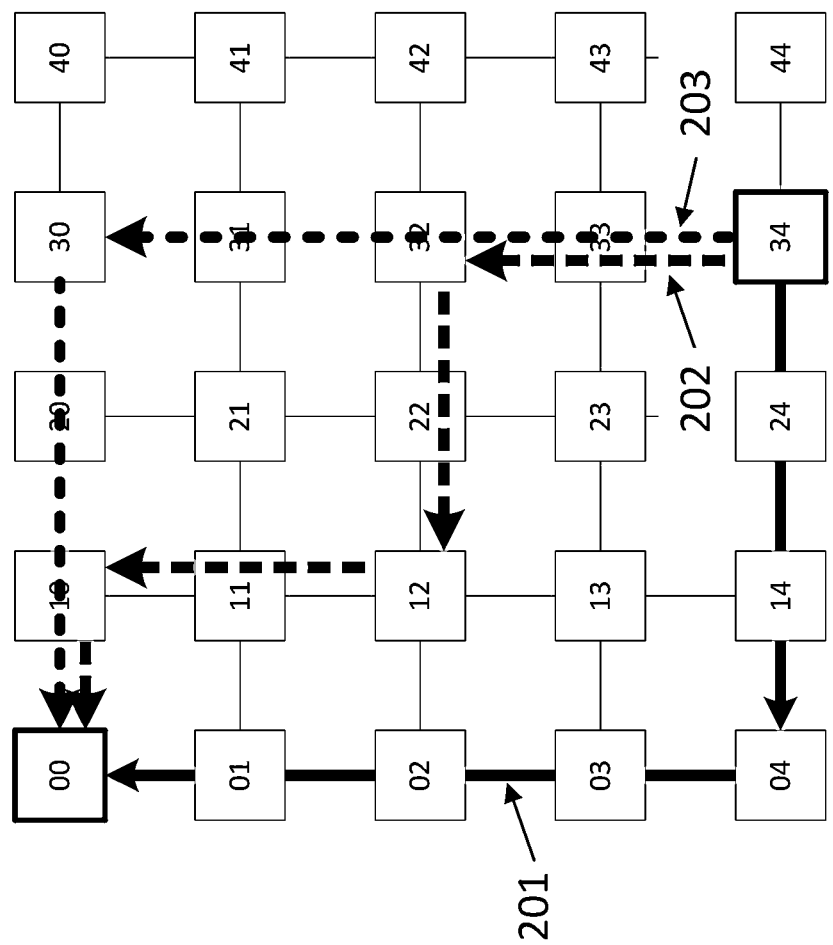
FIG. 2(b) illustrates three different routes between a source and destination nodes.
Figure 3A:
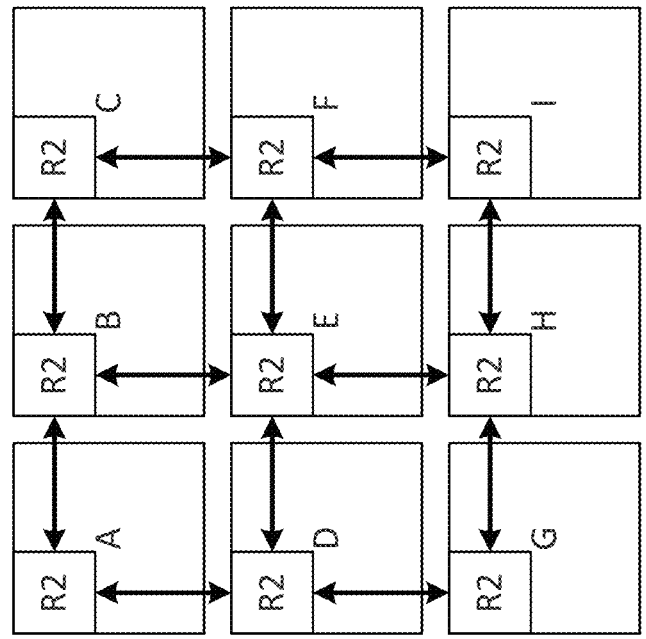
FIG. 3(a) illustrates an example of a related art two layer NoC interconnect.
Figure 3A:
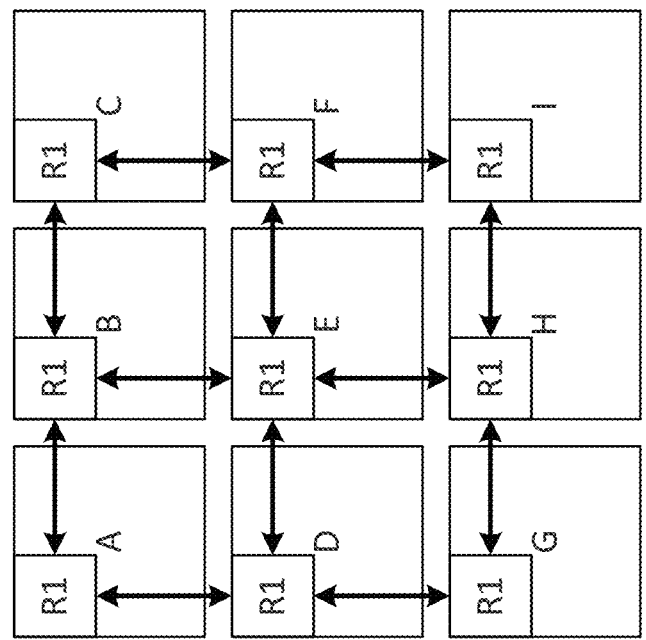
Figure 3B:
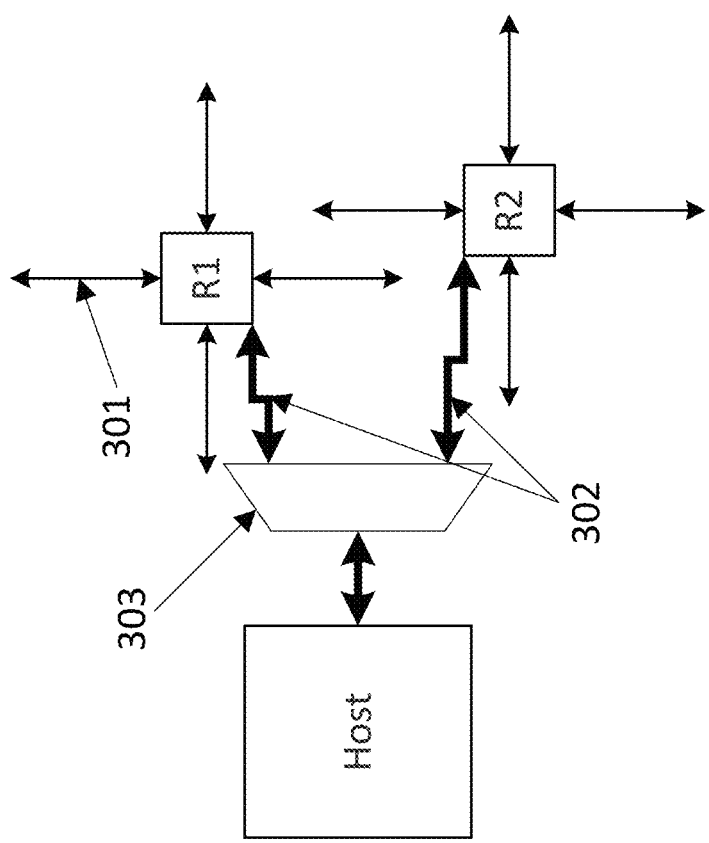
FIG. 3(b) illustrates the related art bridge logic between host and multiple NoC layers.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

Figure 4:
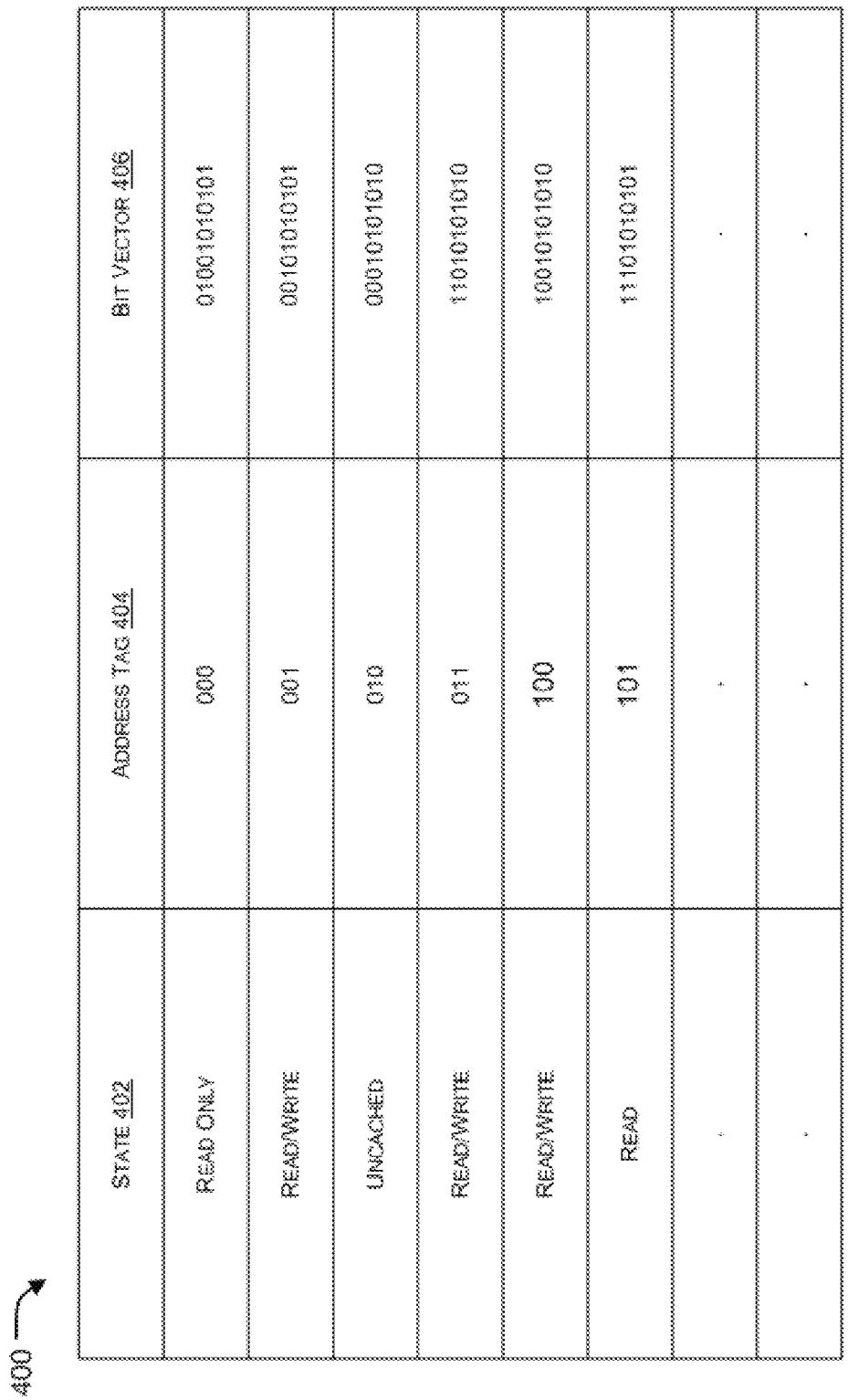
FIG. 4 illustrates an example directory for a cache coherent system.

Example implementations involve providing a tracking mechanism in the directory for the potentially dirty agent. In an example directory entry in the related art as illustrated in FIG. 4, there is a field for state information 402, address tag 404, and share vector 406, wherein the share vector 406 is a bit vector indicating if agent has copy of the line. However over time, the directory will lose track of which agent holds the original copy. Example implementations can be utilized for any cache coherent system, such as a NoC.

FIG. 5 illustrates a directory structure 500 in accordance with an example implementation. In an example implementation, another field 508 can be added and denoted as the encoded value, which indicates the original owner of the line. In the example illustration of FIG. 5, the entries of encoded value 508 include the specific agent that is the original owner. Any other implementation to facilitate the logical representation of the specific agent can also be utilized/configured, such as, but not limited to, using the agent address or a hash value, or any other implementation to indicate the agent. The original holder may have held or modified the original line. By tracking the original holder, example implementations can track the agents that are potentially dirty, as the encoded value will indicate the agent with the most recently unique line, which is shared by the other agents.

In an example implementation, an agent designated in the encoded value 508 can also be included in the bit vector 506, for implementations where the bit vector 506 is used to indicate only the agents that share a copy of the data. In this manner, share state 502 (which can be represented as a share vector) of an address can be represented by the directory 500 along with the bit vector 506 that is indicative of a list of shared agents in a cache coherent system of the data line and includes the encoded value 508 indicative of a potentially dirty one of the shared agents. In other example implementations, the agent is not included in the bit vector if it is not to be considered as the agent sharing a copy of the data.

In an implementation, using the encoded value enables removal of the unnecessary snoops as the snoops can be sent to the agent indicated in the encoded value to ascertain whether the agent has a dirty copy. The agent indicated by the encoded value is known to have a copy, and may also have a chance of being dirty.

In another implementation, when an agent of the encoded value is evicted or otherwise loses the copy of the line via a writeback or by other methods, the encoded value 508 can be set to a NULL value. When the directory entry indicates a NULL value for the encoded value 508, it can be interpreted that no agent has a dirty copy. In example implementations, when the encoded value 508 is NULL, a snoop can be conducted to one of the agents by some algorithm such as first find to obtain a copy of the line. Another example implementation can involve not conducting a snoop to the agents and obtaining a copy of the line from the memory instead, as none of the agents contains a dirty copy.

In yet another example implementation, if the agent indicated by the encoded value 508 provides a snoop response with dirty data and gives up the copy of the line, the encoded value can also be changed to NULL as no agent contains a dirty copy of the line. In implementations where the dirty data is provided to the requestor, the encoded value 508 can be changed to the agent receiving the dirty data as the new encoded owner. In such a case, the agent previously indicated by the encoded value 508 can be moved into the bit vector 506 as an agent sharing the line, particularly in implementations where the data is not discarded by the previous agent and the bit vector is used to represent agent shares. Such example implementations can thereby delay a writeback to memory by sending the dirty data to the requesting agent, and thereby save bandwidth within the cache coherent system. In such example implementations, when the requesting agent needs to modify the received data, the requesting agent will perform operations accordingly.

Based on the encoded value 508, example implementations can thereby facilitate different types of snoops. Examples of snoops that can be implemented are snoop operations with data retrieval, and snoop operations without data retrieval. The snoop operation can contain a flag to indicate if data retrieval is requested or not. If there is no request for data retrieval in the snoop operation, the agent does not send data. In example implementations involving a snoop operation with no data retrieval, the snoop can invoke a drop copy or state transition operation. In another example implementation, a broadcast invalidate snoop can be invoked to all agents to have the respective caches invalidated. The broadcast invalidate snoop can include a flag to indicate that no data retrieval is required, whereupon the agents receiving the snoop would conduct a cache invalidate operation. In another example implementation, an operation for invalidating multiple agent can send a data retrieval snoop only to the potentially dirty agent based on the example implementations above, while sending only invalidations to the other agents.

In example implementations, a data retrieval snoop can be utilized to snoop for obtaining the copy of the line without any further operations. The data retrieval snoop can utilize the flag.

In example implementations, the snoops can be can be invoked by the agents, or can be invoked by the interconnect, or by a combination thereof. For example, snoops can be dropped in the interconnect and sent to the boundary of the interconnect.

Figure 6:
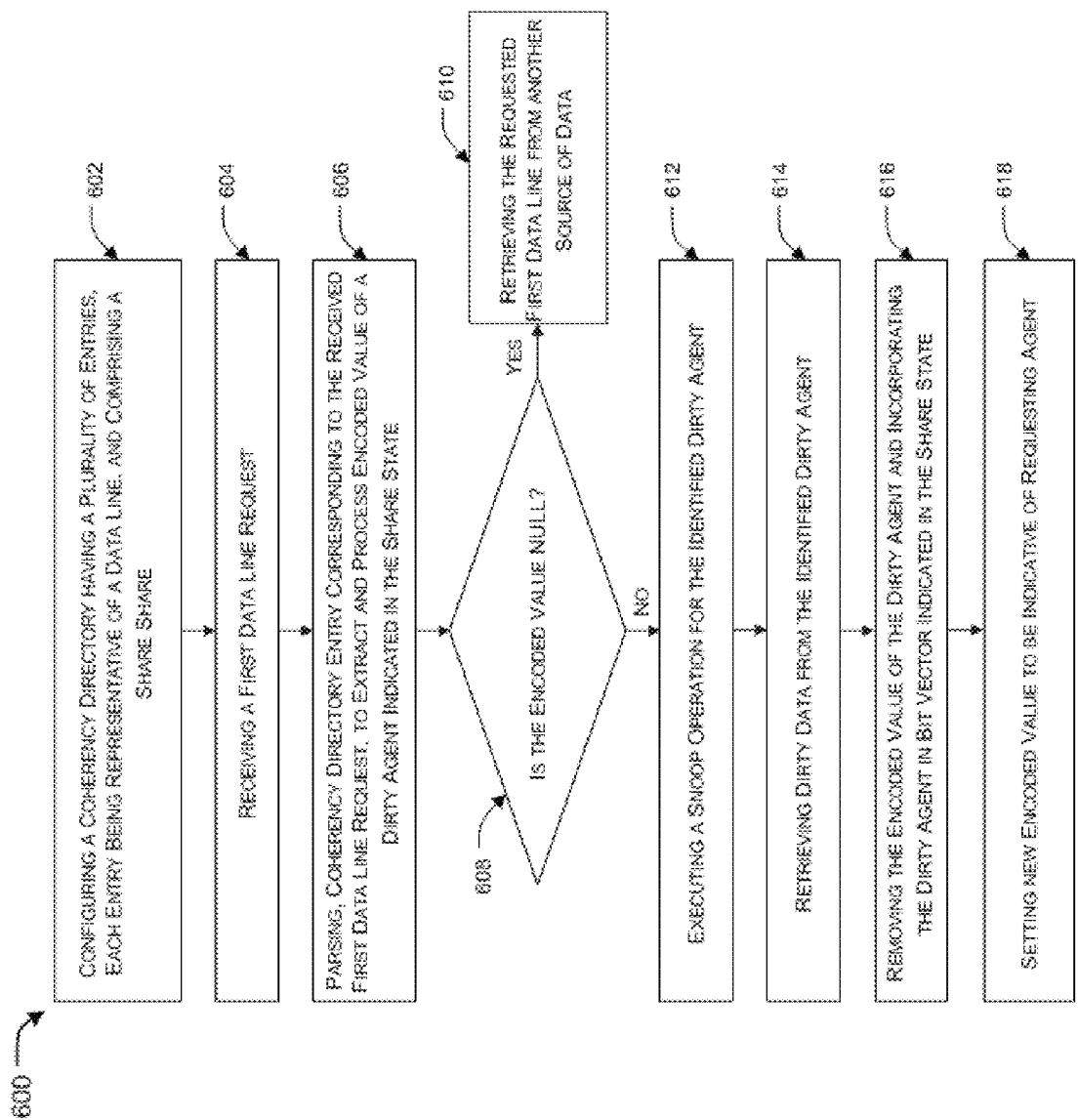
FIG. 6 illustrates an exemplary flow diagram in accordance with an example implementation.

FIG. 6 illustrates an exemplary flow diagram 600 in accordance with an example implementation. At step 602, a coherency directory is configured to have a plurality of entries, wherein each entry is representative of a data line, and where each entry comprises a state. In an exemplary implementation, share state can be configured to include and/or be associated with a bit vector indicative of shared agents, and an encoded value as an indicator of a potentially dirty agent. Such a bit vector and/or encoded value can also be stored separate from the share state but as part of each entry, for instance. Directory construction can further include an address tag. Any desired representation can be incorporated for indicating a potentially dirty agent, which can include the agent number, agent identifier, or any other like representation. At step 604, a first data line request is received from a requester agent, wherein, at step 606, the first data line request is taken into account for parsing the coherency directory to identify the entry corresponding to the first data line and parse the content of the identified entry. From the parsed entry, encoded value of the retrieved potentially dirty agent can be processed. Such an encoded value, as mentioned above, can either be stored as part of the share state or can be stored separately in the entry.

At step 608, it is determined as to whether the encoded value of the retrieved potentially dirty agent is NULL, wherein at 610, in case the encoded value of the retrieved potentially dirty agent is NULL, requested first line data can be retrieved from another source of data. At step 612, in case the encoded value of the retrieved potentially dirty agent is not NULL, a snoop operation can be executed for the identified potentially dirty agent, and at step 614, dirty data is extracted from the identified potentially dirty agent. At step 616, encoded value of the potentially dirty agent can be removed and the potentially dirty agent can be incorporated into the bit vector, wherein the bit vector can, as mentioned above, either be part of the share state or can be stored separately in each entry. At step 618, a new encoded value can be set such that the new encoded value is indicative of the requesting agent.

FIG. 7 illustrates an exemplary architecture block diagram of a cache coherent system 700 showing a cache coherency controller 702 in accordance with an embodiment of the present disclosure. Although the present representation/illustration of system 700 has been shown with reference to NoC architecture, one should appreciate that NoC is merely exemplary and the same does not limited the scope of the present disclosure in any manner. As shown, controller 702 of the present disclosure is configured to be a part of memory communication controller 710 and execute a memory access instruction, and configured to determine a state of a cache line addressed by the memory access instruction, the state of the cache line being one of shared, exclusive, or invalid. Such a memory communications controller 710 is also configured to broadcast an invalidate command to a plurality of IP blocks of the NOC if the state of the cache line is shared and transmit an invalidate command only to an IP block that controls a cache where the cache line is stored if the state of the cache line is exclusive.

In one aspect, cache coherent system 700 of the present disclosure comprises a plurality of integrated processor (IP') blocks such as 706a, 706b, and 706c, collectively referred to as IP blocks 706 hereinafter, one or more routers 708, one or more memory communications controllers 710, and one or more network interface controllers 712. In an example embodiment, each IP block 706 can be adapted to a router 708 through a memory communications controller 710 and a network interface controller 712. Each memory communications controller 710 controls communications between an IP block 706 and memory, and each network interface controller 712 controls inter-IP block communications through routers 708. In the example of FIG. 7, one set 714 of an IP block 706a adapted to a router 708 through a memory communications controller 710 and network interface controller 712 is expanded to aid a more detailed explanation of their structure and operations. All the IP blocks, memory communications controllers, network interface controllers, and routers in the example of FIG. 7 can be configured in the same manner as the expanded set 714.

In the example of FIG. 7, memory communications controller 710 of the set 714 can include a cache coherency controller 702 with coherency control logic 716 capable of retrieving cache line state from a cache coherency directory 718. In an example implementation, coherency control logic 716 can be configured to implement the cache coherent system of the present disclosure, wherein the controller 702 can be configured to manage the coherency directory 718 comprising a plurality of entries, wherein each entry comprises a data line and a share state indicative of a list of shared agents in the cache coherent system of the data line, wherein the share state is also indicative of a potentially dirty one of the shared agents.

In an implementation, controller 702 can further be configured to execute a request for a data line by parsing one of the plurality of entries corresponding to the data line. In case, during the parsing, a potentially dirty one of the shared agents is found, a snoop operation can be executed only to the potentially dirty one of the shared agents indicated by the share state, whereas, in case no potentially dirty agent is found, i.e. a null encoded value is identified, retrieval of the requested data line from any one of other sources of data can be performed.

In another implementation, controller 702 can be configured to, for a dirty data response to the snoop operation for the one of the plurality of entries, remove the encoded value and incorporate the potentially dirty agent of the cache coherent system corresponding to the encoded value to the share vector. In yet another implementation, for the dirty data response to the snoop operation for the one of the plurality of entries, the dirty data in response to the request can be provided to the requester agent and a new encoded value can be assigned to the requesting agent. In another implementation, the snoop operation can include an indication for one of an execution of data retrieval and non-execution of data retrieval.

In an example implementation, the present disclosure further includes a non-transitory computer readable medium storing instructions for executing a process, wherein the instructions include managing a coherency directory comprising a plurality of entries, wherein each entry includes a data line and a share state indicative of a list of shared agents in a cache coherent system of the data line, wherein the share state or any other attribute of the directory entry is also indicative of a potentially dirty one of the shared agents.

In an implementation, the non-transitory computer readable medium can be configured to execute a request for a data line by parsing one of the plurality of entries corresponding to the data line. During parsing, in case one of the plurality of entries is found to have a potentially dirty agent, a snoop operation can be executed only to the potentially dirty agent indicated by the share state. On the other hand, in case no potentially dirty agent is found, i.e. encoded value in the directory entry is NULL, retrieval of the requested data line from any one of other sources of data can be performed. In an implementation, during or after the snoop operation, the encoded value can be removed and the potentially dirty agent can be incorporated into the share vector. Furthermore, during or after the snoop operation, dirty data in response to the data line request can be provided to the requester agent and a new encoded value can be set in order to be indicative of the requester agent.

These algorithmic descriptions and symbolic representations are the means used by those skilled in the data processing arts to most effectively convey the essence of their innovations to others skilled in the art. An algorithm is a series of defined operations leading to a desired end state or result. In the example implementations, the operations carried out require physical manipulations of tangible quantities for achieving a tangible result.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A method, comprising:
managing a coherency directory comprising a plurality of entries, each entry comprising a data line and a share state indicative of a list of shared agents in a cache coherent system of the data line, the share state also indicative of a potentially dirty one of the shared agents;
executing a request for a data line by parsing one of the plurality of entries corresponding to the requested data line;
for the parsed one of the plurality of entries having the potentially dirty one of the shared agents, executing a snoop operation only to the potentially dirty one of the shared agents indicated by the share state;
for the parsed one of the plurality of entries having a null encoded value, performing a retrieval of the requested data line from any one of other sources of data.

2. The method of claim 1, further comprising:
for a dirty data response to the snoop operation for the one of the plurality of entries, removing the encoded value and incorporating an agent of the cache coherent system corresponding to the encoded value to a share vector.

3. The method of claim 1, further comprising:
for a dirty data response to the snoop operation for the one of the plurality of entries, providing dirty data in response to the request; and
setting the encoded value to be indicative of an agent of the cache coherent system that issued the request.

4. The method of claim 1, wherein the snoop operation further comprises an indication for one of an execution of data retrieval and non-execution of data retrieval.

5. A non-transitory computer readable medium storing instructions for executing a process, the instructions comprising:
managing a coherency directory comprising a plurality of entries, each entry comprising a data line and a share state indicative of a list of shared agents in a cache coherent system of the data line, the share state also indicative of a potentially dirty one of the shared agents;
executing a request for a data line by parsing one of the plurality of entries corresponding to the requested data line;
for the parsed one of the plurality of entries having the potentially dirty one of the shared agents, executing a snoop operation only to the potentially dirty one of the shared agents indicated by the share state;
for the parsed one of the plurality of entries having a null encoded value, performing a retrieval of the requested data line from any one of other sources of data.

6. The non-transitory computer readable medium of claim 5, wherein the instructions further comprise:
for a dirty data response to the snoop operation for the one of the plurality of entries, removing the encoded value and incorporating an agent of the cache coherent system corresponding to the encoded value to a share vector.

7. The non-transitory computer readable medium of claim 5, wherein the instructions further comprise:
for a dirty data response to the snoop operation for the one of the plurality of entries, providing dirty data in response to the request; and
setting the encoded value to be indicative of an agent of the cache coherent system that issued the request.

8. The non-transitory computer readable medium of claim 5, wherein the snoop operation further comprises an indication for one of an execution of data retrieval and non-execution of data retrieval.

9. A cache coherent system comprising:
a cache coherent system controller configured to manage a coherency directory comprising a plurality of entries, each entry comprising a data line and a share state indicative of a list of shared agents in the cache coherent system of the data line, the share state also indicative of a potentially dirty one of the shared agents;
wherein the cache coherent system controller is configured to:
execute a request for a data line by parsing one of the plurality of entries corresponding to the requested data line;
for the parsed one of the plurality of entries having the potentially dirty one of the shared agents, execute a snoop operation only to the potentially dirty one of the shared agents indicated by the share state;
for the parsed one of the plurality of entries having a null encoded value, perform a retrieval of the requested data line from any one of other sources of data.

10. The cache coherent system of claim 9, wherein the cache coherent system controller is configured to:
for a dirty data response to the snoop operation for the one of the plurality of entries, remove the encoded value and incorporating an agent of the cache coherent system corresponding to the encoded value to a share vector.

11. The cache coherent system of claim 9, wherein the cache coherent system controller is configured to:
for a dirty data response to the snoop operation for the one of the plurality of entries, provide dirty data in response to the request; and
set the encoded value to be indicative of an agent of the cache coherent system that issued the request.

12. The cache coherent system of claim 9, wherein the snoop operation further comprises an indication for one of an execution of data retrieval and non-execution of data retrieval.

* * * * *